United States Patent [19]
Quay et al.

[11] 3,775,738
[45] Nov. 27, 1973

[54] SELECTIVE SEQUENTIAL INPUT SWITCHING METHOD FOR SEISMIC SURVEYING

[75] Inventors: Roy G. Quay; William Harry Mayne, both of San Antonio, Tex.

[73] Assignee: Petty Geophysical Engineering Company, San Antonio, Tex.

[22] Filed: Apr. 28, 1972

[21] Appl. No.: 248,535

[52] U.S. Cl... 340/7 R, 340/15.5 CP, 340/15.5 MC, 346/33 C
[51] Int. Cl. ............................ G01v 1/38, G01v 1/36
[58] Field of Search ..................... 340/7 R, 15.5 CP; 346/33 C

[56] References Cited
UNITED STATES PATENTS

| | | | |
|---|---|---|---|
| 3,133,262 | 5/1964 | Strange | 340/15.5 MR |
| 3,437,989 | 4/1969 | Proffitt | 340/7 R |
| 3,351,899 | 11/1967 | Lurhrmann et al. | 340/7 R |
| 3,290,644 | 12/1966 | Hoskins | 340/7 R |

*Primary Examiner*—Benjamin A. Borchelt
*Assistant Examiner*—N. Moskowitz
*Attorney*—Tom Arnold et al.

[57] ABSTRACT

A method of seismic data acquisition wherein a recording system may be provided with fewer recording channels as compared with the number of groups of seismic wave detectors of a seismic spread, such as a seismic streamer adapted to be towed by a vessel through bodies of water. Switching means is provided that is capable of switching the recorder channels to receive signals from selected groups of detectors in a predetermined sequence, such as the even numbered then odd numbered detector groups, for example on successive shots occurring at selected group spacing to yield multiple observations of subsurface points spaced at the same interval as the group spacing of the streamer detectors with significant reduction in the volume of digital tape and digital processing necessary for purposes of horizontal shot stacking.

20 Claims, 2 Drawing Figures

SELECTIVE SEQUENTIAL INPUT SWITCHING METHOD FOR SEISMIC SURVEYING

BACKGROUND OF THE INVENTION

This invention relates generally to seismic data acquisition and more particularly to a method of seismic data acquisition that is accomplished in such manner as to achieve horizontal stacking data acquisition techniques at rapid speed and low cost. The invention may relate to seismic data acquisition in both marine and land surface environments, but for purposes of simplicity, the invention will be discussed primarily as it relates to seismic exploration in a marine environment.

In marine seismic data acquisition, it is customary to employ a seismic cable which may also be referred to as a streamer, is provided with groups of detectors or hydrophones, which may also be referred to as signal channels, located at equally spaced intervals along the length thereof which are capable of detecting seismic waves being transmitted through earth formations and through a body of water. The seismic cable with its detector groups, which is also referred to in the industry as a "seismic spread" is towed through the water by a vessel.

In operation, using the "reflection" method, a seismic wave is generated at a "shot point" in the vicinity of the seismic spread, which seismic waves or shock waves, as they are frequently referred to, travel through the water and through earth strata beneath the body of water and are reflected back to groups of hydrophone detectors provided to sense the reflected waves and cause recording apparatus to record a number of points corresponding to the number of active recording channels connected at any one time to various ones of the hydrophone groups. Seismic waves may be generated by detonating an explosive substance, such as dynamite, in the water or in the earth or by impacting the earth with a weight device. Seismic waves may also be generated acoustically by any of a number of commercially acceptable means. The length of the subsurface profile reflected is generally equal to one-half of the overall spacing of the active hydrophone groups in the hydrophone spread in view of the geometric pattern of the reflected waves that are detected by the hydrophones. Geological formations below the floor or bed of the body of water may also be detected through reflections at earth surfaces where the density or other properties of the strata undergo abrupt changes.

It has generally been the practice to generate a seismic wave or shot point at a location offset from the line of equally spaced hydrophone groups, although the specific relation of a shot point to the seismic spread may be varied in accordance with the type of seismic data to be acquired. Where a seismic cable is towed, it is desirable to generate the shot point at a specific point relative to the spread.

The vessel towing the seismic spread may stop briefly while the seismic wave generation and recording is accomplished or it may be practical to continue movement of the seismic spread at a relatively slow speed and compensate mathematically for discrepancies in the data acquired that might result due to such movement. The technology has developed at the present time sufficiently to allow the towing vessel to continue towing the cable at a predetermined speed during the shooting and recording procedure without adversely affecting the validity of the reflected seismic data. Consequently, it is generally considered desirable to maintain movement of the seismic spread through the water at a constant and relatively low speed at which the noise level produced by towing the cable will be sufficiently insignificant that towing noise will not interfere with data acquisition.

During seismic exploration, it has been found desirable to employ a seismic data acquisition technique which may be referred to as the "horizontal shot stacking" technique or as the CRP technique. CRP is a registered trademark of Petty Geophysical Engineering Company. This technique eliminates false seismic indications that are occasionally produced by multiple reflections that may occur when there exists a sharp discontinuity both at the bottom of the ocean and at a dominant strata below the bottom of the ocean. Under these adverse conditions seismic waves pass through the bottom of the ocean and are reflected from the dominant strata back to the bottom or surface of the ocean and then the seismic waves are reflected by the bottom or surface downwardly again to the dominant strata and they are finally reflected upwardly through the ocean floor to the hydrophone array. Multiple reflections of this nature give a false indication of an additional discontinuity located below the dominant strata by a distance equal to the spacing between the ocean floor and the dominant strata. Such multiple reflections also frequently override and obscure primary reflections from deep strata. The problems caused by "normal moveout," which is a natural phenomenon, generally referred to as the distance in the time of arrival of seismic reflection from a horizontal plane, may be compensated for by conventional mathematical and data processing techniques that have been employed for a considerable period of time.

Horizontal shot stacking is typically accomplished by making a first recording with the source and the detector spread in one location. A second recording is then made with the source advanced a predetermined distance and with the detectors used for recording advanced a similar distance. By moving the source and the detector spread the equivalent of one detector station spacing between each recording, traces are recorded which cover the same subsurface reflecting point a multiple number of times. If the source and a detector spread having 48 detectors move one-half detector station spacing between each recording and all 48 stations are recorded, eventually there will be recorded 48 traces representative of the same reflecting point. These multiply recorded reflection points will be spaced at one-half detector interval in the subsurface. The type of surveying wherein there are 48 traces having the same reflecting point is generally known in the art as 48 fold coverage. By compositing the channels representative of the same reflecting point, noise and multiple reflections may be attentuated and subsurface observations made at one-half detector station interval.

Where it is desired to accomplish full 48 fold redundancy of subsurface coverage, it would ordinarily be expected that the seismic recorder be provided with 48 separate recording channels. A seismic recorder provided with this number of recording channels would detract from the competitive nature of the data thus acquired because of the initial expense of the recorder.

The nature of seismic propagation sets a practical limit as to the longest, shot-to-detector group distance at which useful reflection energy from the subsurface can be observed before being obscured by energy propagating by refraction paths, etc. This practical limit has already been reached with streamer lengths currently in use with the more common 24-detector stations. Consequently, 48-station streamers have station intervals half as large as the more common 24-station streamers in order to stay inside the practical limit of length.

As a result, the use of a 48-station streamer with 48 recording channels with shots at one-half station intervals, not only results in a 48-fold stack as desired, but produces subsurface observation points spaced twice as close as desired. Thus, the desired result of a 48-fold stack is achieved with the undersirable result that twice as much recorded data is provided as is desired. This represents uneconomic use of digital recording tape and subsequent computer processing.

The main object of increased fold or redundancy of stack is to improve signal clarity without increasing the density of subsurface observation points.

It is accordingly a primary object of the present invention to provide a novel method of seismic data acquisition involving the towing of a seismic spread and which is effective to provide full fold subsurface coverage while utilizing a minimum number of active detector channels and recorder channels.

It is an even further object of the present invention to provide a novel method of marine seismic data acquisition that is capable of yielding redundant observations for purposes of horizontal shot stacking which number of redundant observations in equal to the number of detector groups with which the seismic spread may be provided.

Among the several objects of the present invention is noted the contemplation of a novel method of marine seismic data acquisition that effectively allows recorded redundant observations that equal the number of detector groups of a seismic spread while maintaining usage of magnetic tape and data processing effort at a minimum.

It is another object of the present invention to provide a novel method of marine seismic data acquisition that requires only half or fewer as many recording channels as the number of detector groups of seismic spread and yet achieve maximum fold subsurface coverage.

An even further object of the present invention contemplates the provision of a novel method of marine seismic data acquisition that employes mechanical or electronic switching means to select detected data in a predetermined sequence spanning the full spread length such as alternately from even numbered detector groups and then odd numbered detector groups of a seismic spread.

It is also an object of the present invention to provide a novel method of seismic data acquisition that may be employed either during land based or marine based seismic operations to provide maximum fold subsurface coverage.

It is an even further object of the present invention to provide a novel method of marine seismic data acquisition wherein seismic data is acquired at an optimum rate at which resultant costs of acquiring and computer processing seismic data are sufficiently lowered to substantially enhance the competitive nature of the method.

Other and further objects, advantages and features of the present invention will become apparent to one skilled in the art upon consideration of the written specification, the attached claims and the annexed drawings. The form of the invention, which will now be described in detail, illustrates the general principles of the invention, but it is to be understood that this detailed description is not to be taken as limiting the scope of the present invention.

THE PRIOR ART

Since the granting of U.S. Pat. No. 2,732,906 in 1956, many patents have been granted on various methods of recording and combining seismic data to achieve multiple fold stacked data. For example, the recorded traces may be weighted or mixed in order to achieve a more continuous sequence of events as taught by Ehlert et al. U.S. Pat. No. 3,181,643 or different dipped angles of the reflecting beds may be determined and utilized to identify the reflections prior to the combining of seismic data into a stacked section as set forth in the U.S. Pat. No. to Mendenhall et al. 3,217,828. Alternatively, as taught by the U.S. Pat. No. to Strange, 3,133,262, multiple spreads may be employed having differing detector intervals at different water depths to record deep or shallow reflections. Symmetrical full fold stacking has been suggested by Ellis (U.S. Pat. No. 3,412,373) and Kerns (3,353,152).

Reference may also be had to U.S. Pat. No. 3,181,643 which discloses subject matter similar to that disclosed by Kerns in U.S. Pat. No. 3,353,152 and to U.S. Pat. No. 3,206,720 to Kerr which discloses a method and apparatus for aligning seismograms in time. Reference may also be had to Geophysics, Vol. XXVII, No. 6, Part II (Dec., 1962), pp. 952–965 which discloses a "Thumping Technique Using Full Spread of Geophones" by Robert B. Peacock and D. M. Nash, Jr.

Stacking switches are well known for use with seismic cables designed for use in conducting land based seismic operations for stacking reflected seismic data. Here the switching is used to add on groups in the forward direction and drop groups behind.

Another device forming a part of the prior art and employed perhaps in conjunction with a switching mechanism for purposes of shot stacking, is the method of alternately reversing the polarity of the drive to a Vibroseis vibrator and the polarity of all of the detectors of a seismic cable. It is not practical however to employ this particular method when the polarity of the means for generating the seismic wave cannot be reversed.

SUMMARY OF THE INVENTION

In order to reduce the volume of data recorded when seismic streamers are employed having a large number of detector stations, in accordance with the present invention, a switching mechanism may be employed to select a predetermined sequence of traces spanning the full spread length such as for example to alternately record the even numbered traces and then record the odd numbered traces from the multi-detector cable on successive shots taken at one-half the group spacing the multi-trace cable. For example, where a 48 trace cable is employed it will be necessary to provide only 24 recording channels which are alternately connected between shots by the switching mechanism to selected groups of the detectors, such as even or odd groups of the detectors of the 48 trace cable, for example. This method will effectively produce 48 fold subsurface coverage, spaced at the same interval as the group spacing of the 48 trace cable. A detector spacing arrangement having detectors arranged at 50 meter group spacing intervals may be employed to yeild a true 48 fold coverage at each 50 meters in the subsurface. 50 meter subsurface spacing has been found adequate for resolution in nearly all parts of the world. One advantage of employing higher fold coverage is the increase in the number of discrete recording distances available for velocity analysis and noise attenuation at any given subsurface point. This advantage is retained by the present invention even though only 24 recorded channels are used to provide 48 discrete distances for velocity analysis at any reflection point.

BRIEF DESCRIPTION OF THE DRAWINGS

So that the manner in which the above recited features, advantages and objects of the present invention, as well as others, which will become apparent, are attained and can be understood in detail, more particular description of the invention, briefly summarized above, may be had by reference to the preferred embodiment thereof, illustrated in the appended drawings, which drawings form a part of this specification.

It is to be noted, however, that the appended drawings illustrate only a typical embodiment of the invention and are, therefore, not to be considered limiting of its scope, for the invention may admit to other equally effective embodiments.

IN THE DRAWINGS

DESCRIPTION OF PREFERRED EMBODIMENTS

Figure 1:
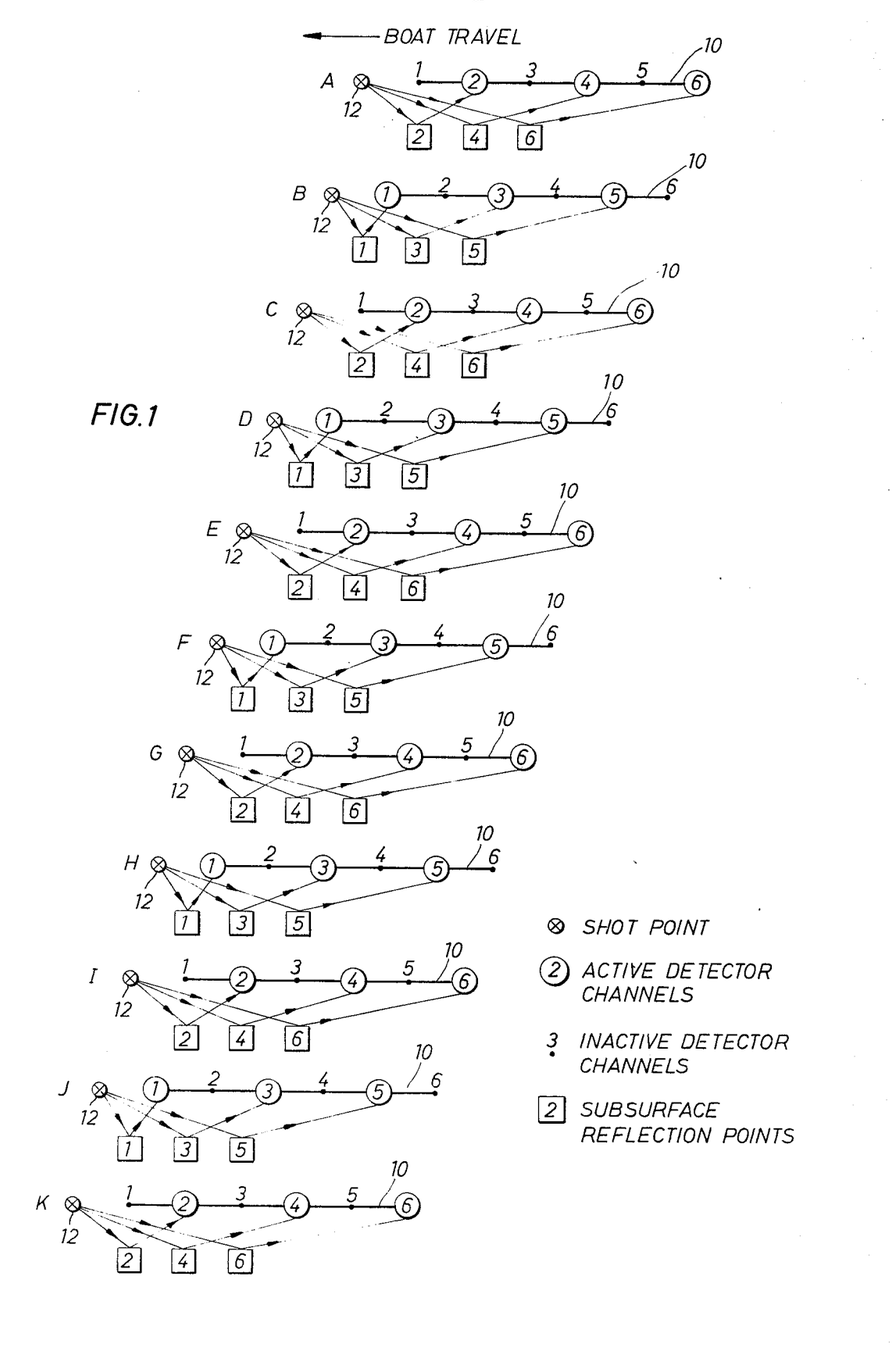
FIG. 1 is a graphic representation of a seismic traverse conducted in accordance with the present invention involving a seismic streamer having six detector stations and illustrating movement of the shot point and the alternate switching to the even or odd numbered groups of the detector spread.
Figure 2:
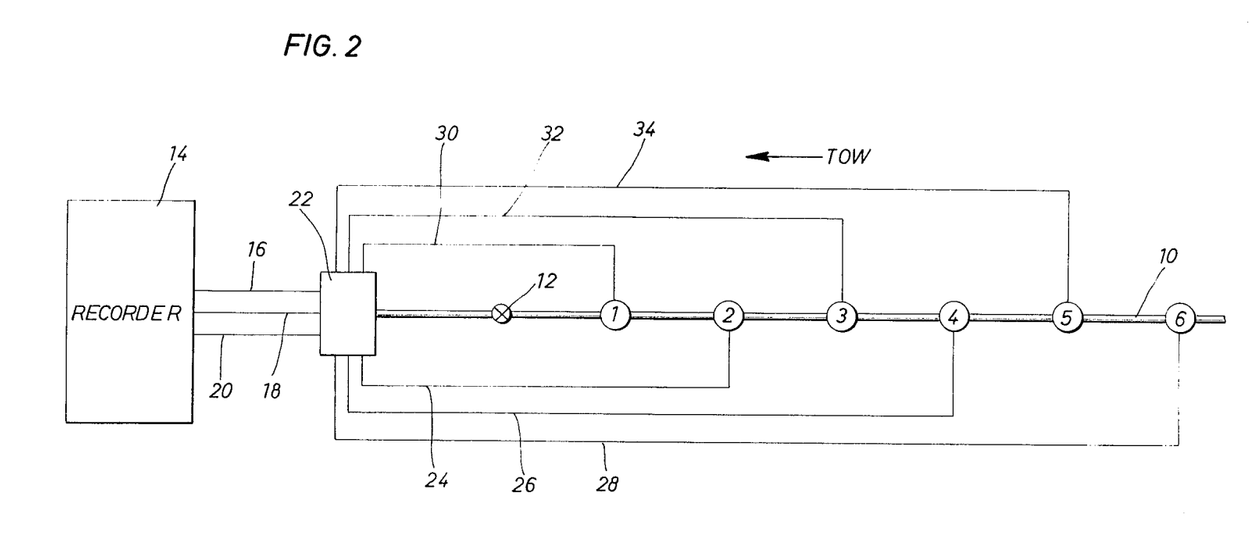
FIG. 2 is a schematic representation of a seismic streamer having six detector channels and illustrating electrical connection of detector channels to a three channel recorder through a switching mechanism that connects the recording channels to the even then the odd numbered detector channels, then back to even.

Now referring to the drawings there is illustrated in FIGS. 1 and 2 a seismic cable or streamer or spread 10 that may be towed through the water by a vessel in conventional manner. The streamer or spread 10 may be provided with a plurality of detector groups identified by reference numerals 1–6.

The invention shall be described herein in conjunction with a seismic spread having only six detector groups each detector group being a geophone or other detector device for detecting seismic waves and the electrical circuitry through which the electrical impulse representing the seismic wave may be transmitted through a recorder channel. Although the seismic spread illustrated in FIGS. 1 and 2 incorporates only six detector stations it should be borne in mind that this minimum number of detector stations is represented only for purposes of simplicity. Seismic streamers for seismic surveying operations in marine environments will typically be provided with a large number of detector stations for example 36 or 48 detector stations in order to simultaneously record a large number of reflected waves which may be added or "stacked" mathematically to provide a graphical representation of the subsurface environment.

It will be desirable to generate a seismic wave that may be reflected from a number of points on the subsurface profile and are detected by the geophones or other detector apparatus located at the detector stations along the length of the streamer 10. It is important that the seismic wave be generated at a specific point relative to the seismic spread and therefore a seismic wave generation device may be physically connected to the seismic cable or may be located on the towing vessel. It will generally be more practical to locate the seismic wave generation device on the towing vessel. As illustrated in FIGS. 1 and 2 a seismic wave generating device 12, which is typically referred to as a "shot point" is shown to be connected physically to the seismic streamer 10 ahead of the first detector station 1. The seismic wave generating device 12 may conveniently take the form of any one of a number of suitable commercially available seismic wave generating devices within the spirit and scope of the present invention.

As the seismic waves reflected from the subsurface environment are detected by the detectors one through six electrical impulses representative of the reflective waves are transmitted through electrical circuits to a recording facility where the electrical impulses are graphically recorded by any one of a number of suitable recording devices. Presently it is deemed practical to record the electrical impulses on magnetic tape and, after suitable mathematical operations have been conducted by computer, to eliminate falsely detected waves multiple reflections and the like, a print out may be provided that is representative of the subsurface environment.

As illustrated in FIG. 2 a recorder 14 having three recorder channels is shown to be provided with channel circuits 16, 18 and 20 that may selectively be connected to various ones of the detector circuits to record electrical pulses from selected groups of three of the detectors.

It will be convenient to selectively connect even or odd numbered groups of the detectors to the recorder channels 16, 18 and 20 alternately on successive shots generated at the shot point 12 in order to produce a full fold subsurface coverage spaced at the same interval as the group spacing of the detectors located along the seismic streamer 10. To achieve such selective connection between the recorder channel and the circuits of the detectors one through six a switching mechanism 22 may be provided that may conveniently take the form of either a mechanical switching mechanism such as a rotary switch or an electronic switching mechanism that may switch repeatedly on successive shots to alternately connect even or odd numbered groups of the detectors to the recorder channels. It should be borne in mind that the recorder 14 although shown to include only three recorder channels for purposes of simplicity will typically include a large number of recording channels substantially equaling half the number of detector groups located along the seismic streamer 10. For example, a seismic streamer having 48 detector stations located along the length thereof may be utilized along with a recorder having 24 channels.

As indicated above the nature of seismic propagation determines a practical limit as to the longest, shot-todetector group distance at which useful reflection energy from the subsurface can be observed before being obscured by energy propagated by refraction paths, etc. Under present techniques this practical limit has already been reached with streamer lengths currently in use with the more common 24 detector stations. Consequently, 48 station streamers have station intervals half as large as the more common 24 station streamers in order to stay inside the practical limit of shot-to-detector group distance.

As a result, the use of a 48 station streamer with 48 recording channels with shots at one-half the normal station intervals not only results in a 48 fold stack as desired, but produces subsurface observation points spaced twice as close as desired. Thus, to acquire a desired 48 fold stack of subsurface point redundancy it is typically necessary to acquire twice as much recorded data as required. This represents uneconomic use of digital recording tape and subsequent computer processing.

The main object of increased fold or redundancy of stack therefore is simply to improve signal clarity and not to increase the density of subsurface observation points.

The present invention however effectively eliminates the need for providing the same number of recorded channels as the number of detector stations with which the seismic streamer is provided. The switching mechanism 22 may be used to reduce the number of recording channels to one-half the number of detector stations located on the seismic streamer. For example, a seismic streamer having 48 detector stations may be effectively utilized with a recorder having only 24 recorder channels. Consequently the volume of electronic data recorded by the recorder 14 will equal one-half of the volume detected at all of the detector stations but the subsurface coverage yielded by the alternate even-odd seismic surveying method embodying the present invention may effectively be stacked to yield multiple fold subsurface coverage equaling the number and spacing of the detectors of the seismic spread. It is important to note that the number of discrete shot-to-detector group distances available for velocity analysis and noise attenuation at any common subsurface reflection point is not reduced by this method.

The switching mechanism 22 will be operative to alternately connect the detector circuits 24, 26 and 28 of the even numbered detector groups 2, 4 and 6 respectively or the electrical circuits 30, 32 and 34 of the odd numbered detector groups 1, 3 and 5 respectively to the recorder channel circuits 16, 18 and 20.

Referring now to FIG. 1 and specifically the streamer position illustrated at the upper portion of FIG. 1, as the legend indicates, detector groups 2, 4 and 6 are active while detector groups 1, 3 and 5 are inactive. The active groups 2, 4 and 6 are connected through the switching mechanism to the recording channels of the recorder. Seismic waves generated at the shot point by seismic wave generator 12 will be reflected from the subsurface reflection points 2, 4 and 6 represented by the square identification symbols. The recorder 14 therefore records the electrical impulses received by the even numbered detector groups 2, 4 and 6 and transmitted through detector circuits 24, 26 and 28 respectively through the switching mechanism and the recorder channel circuits 16, 18 and 20 respectively to the recorder where a permanent record is made either by magnetic tape or by some other suitable means of recording.

As a vessel continues to move the streamer 10 to the left along the desired traverse, a second shot point is generated as shown in line B. As the seismic spread 10 is moved between the shot point positions shown in lines A and B, the switching mechanism 22 will inactivate the detector circuits of the even numbered detector groups 2, 4 and 6 and will activate the detector circuits of the odd numbered detector groups 1, 3 and 5 by connecting the odd numbered detector circuits to respective ones of the recorder channels through the recorder channel circuits 16, 18 and 20. Reflected waves traveling from the shot point shown in line B will be reflected from subsurface reflection points shown at 1, 3 and 5 by the square reference characters. reflections from subsurface points 1, 3 and 5 shown in line B will be recorded by the recorder 14 in the manner discussed above.

Movement of the seismic streamer 10 will continue to the left to the position illustrated in line C at which position the detector circuits of the even numbered detector groups 2, 4 and 6 will be activated by appropriate movement of the switching mechanism while the circuits of the odd numbered detector groups 1, 3 and 5 will have been inactivated by the switching mechanism. The seismic survey will continue with the streamer being moved by the vessel to the left and with the switching mechanism connecting and disconnecting even and odd numbered groups of the circuits of the seismic detectors as shown by the identifying symbols in lines A through K.

As illustrated in lines B through G the seismic survey will continue in such manner that seismic wave reflections from the reference point shown as 1 in line B will be recorded by detector group No. 1 in line B by detector group No. 2 in line C by detector group No. 3 in line D and so on through line G. Between the streamer position shown in line B through G the seismic reflections from the subsurface point identified as 1 in line B will be recorded six times, one time by each of the even and odd numbered detector groups of the seismic cable. After the seismic survey has been accomplished and data has been recorded the reflected data from this particular subsurface reflection point as well as all of the other subsurface reflection points will be analyzed for propagation velocity and "stacked" or added and will be subjected to various mathematical processing to eliminate stray reflections, multiple reflections, vessel noise, streamer noise and any other inadvertently acquired electrical signal that might detract from the accuracy of the survey. Moreover, seismic data acquisition conducted in accordance with the even-odd switching methods of the present invention will yield subsurface coverage equal to the number and spacing of the detector groups with which the seismic spread may be provided. For example, if a seismic spread having 48 detectors is utilized with a recorder having 24 active recording channels with subsurface coverage yielded will be full 48 fold redundant subsurface coverage the reflection points being spaced equal to the spacing of the detectors etectors of the seismic spread. For example, if the detectors of the seismic spread are spaced at fifty meter intervals the spacing of the subsurface reflection points will also be 50 meters.

While it is clearly evident that redundant subsurface coverage can be effectively obtained by the even-odd alternate switching arrangement it should also be borne in mind that certain subsets of subsurface coverage may also be selected for processing after utilizing the even-odd switching method to obtain optimum data input from the seismic streamer to the recorder as indicated in FIG. 1.

In view of the foregoing it is evident that we have provided a novel method of seismic surveying which method can be employed in both land and marine base environments although the method is more readily adaptable to seismic surveying in a marine environment in view of the fact that a seismic streamer may be continually moved at a rather slow speed through a bdoy of water and seismic waves can be generated from successive equally spaced points along the surface of the body of water in which the seismic traverse in taking place. In a land base environment it is more difficult and together consuming to move the shot point and replace the detectors to achieve similar production of data.

The method set forth above effectively provides maximum fold subsurface coverage of reflection points at spacing equal to the spacing of detectors of a seismic streamer even though only half as many recording channels are required as compared with most other methods of seismic data acquistion. The novel method of marine seismic data acquisition set forth above may be accomplished through utilization of simple and reliable mechanical or electronic switching means that allows alternate recording of reflected seismic data from a subsurface environment. It is therefore seen that our invention is one well adapted to attain all of the objects and advantages hereinabove set forth teogether with other advantages which will become obvious and inherent from a description of the method and apparatus set forth herein. It will be understood that certain combinations and subcombinations are of utility and may be employed without reference to other features and subcombinations. This is contemplated by and is within the scope of the present invention.

This discussion is limited to even odd sequential switching solely for simplicity. In similar fashion, it should be appreciated that it is feasible and may be desirable to utilize a streamer cable with an even higher multiple of the number of active recording channels to provide an even higher multiplicity of coverage in relation to the number of active recording channels.

Thus by using the same three recording channels described in the figures, and increasing the number of cable stations to nine, it is possible to develop a ninefold stack by employing a switching mechanism which will connect the three active recording channels to stations 1, 4 and 7; 2, 5 and 8; and 3, 6 and 9 in succession. Recordings would be made with the source and spread advanced by exactly one-half of the interval between cable stations for each successive switch position. The spacing between the subsurface points will be one and one-half times the seismic detector group interval in this case.

Other progressions will yield different ratios between the number of recording channels and the multiplicity of stack, and between the actual seismic detector group spacing and the spacing between the subsurface sampling points.

The general case can be described as follows:

$j$ = the number of seismic detector groups in the spread with equally spaced centers;
$x$ = the interval between the centers of detector groups;
$n$ = the number of recording channels;
$m$ = an interger (1, 2, 3, 4, ---) such that $m = j/n$; and
$w$ = the cycle index.

The connection of selected detector groups occurs cyclically as defined by the sequence:

$\{(w)th, (m+w)th, (2m+w)th, --- [(n-1)m+w]th\}$ wherein the members of each sequence refer to the positions of the selected groups relative to the total spread of seismic detector groups which is considered to be consecutively ordered with the first seismic detector group identified as that group which leads the spread in the direction of the traverse and $w$ is a cycle index equal to 1, 2, 3, ----$m$. The subsurface spacing interval between sets of recordings having common reflection points will be equal to m times $x/2$. There will be $j$ number of recordings in each of these common reflection point sets and each such member of the set will have a unique source to detector distance.

The present method of recording all detector groups represents the special case where m=1. Consequently, in this case $x/2$ alone determines the subsurface interval spacing s. Earlier reference to the fact that the total length of a seismic spread is limited by natural phenomena makes it clear that if the fold of the redundancy is increased, $x/2$ must become smaller as the total practical length d is divided into more segments; thus the spacing interval s of the subsurface observations also decreases. Our method using m greater than one allows this decreased $x/2$ which is multiplied by m to be compensated for thus controlling the spacing of the subsurface points and permitting the desired greater fold of redundancy without the increase in volume of data which would have been introduced by smaller subsurface interval spacing.

As many possible embodiments may be made of this invention without departing from the spirit or scope thereof it is to be understood that all matters hereinabove set forth or shown in the accompanying drawings are to be interpreted as illustrative and not in any limiting sense.

We claim:

1. A method of seismic exploration wherein a seismic source, and a plurality of equally spaced seismic detector groups are advanced along a traverse in a fixed horizontal relationship, seismic data recording means being provided and including a lesser number of recording channels as compared with the number of said seismic detector groups said method comprising:

initiating data acquisition with a first group of alternating detectors, including one of said detector groups and each alternate detector group along at least a portion of the length of said seismic spread, being connected to the recording channels of said recorder;

generating successive seismic waves with said seismic source at locations spaced at selected integral multiples of one half of the spacing between the centers of said detector groups;

cyclically connecting an appropriate subset corresponding to the selected integral multiple of the alternating detector groups to said recording channels between each seismic wave generation, there being at least one unconnected detector group intervening between adjacent groups of alternating detectors in a subset; and recording electrical impulses transmitted by the selected detector groups connected to said recording channels responsive to seismic waves returned from subsurface earth strata.

2. A method according to claim 1, including:
physically moving said seismic spread along a traverse.

3. A method according to claim 1, including:
generating said seismic waves at equally spaced intervals equaling a selected distance including one half of the spacing of said detectors of said seismic spread and any integral multiple of said distance.

4. A method as recited in claim 3, including:
physically moving said seismic spread along a traverse.

5. A method as recited in claim 1 wherein said spread is adapted to be towed through a body of water by a vessel, said method including:
towing said seismic spread through said body of water and stopping said spread at each location of seismic wave generation.

6. A method as recited in claim 1 wherein said seismic spread is adapted to be towed through a body of water by a vessel, said method including:
towing said seismic spread through said body of water at a constant speed during said seismic exploration.

7. A method according to claim 1, including:
generating said seismic waves at equally spaced intervals equaling a selected distance including one-half of the spacing of said detectors of said seismic spread and any integral multiple of said distance.

8. A method as recited in claim 1 wherein said seismic spread is adapted to be towed through a body of water by a vessel, said method including:
towing said seismic spread through said body of water at a constant speed during said seismic exploration; and
generating said seismic waves at equally spaced intervals equaling a selected distance including one-half of the spacing of said detectors of said seismic spread and any integral multiple of said distance.

9. A method of seismic exploration wherein a seismic source, and a plurality of equally spaced seismic detector groups are advanced along a traverse in a fixed horizontal relationship, seismic data recording means being provided and including a lesser number of recording channels as compared with the number of said seismic detector groups said method comprising:
generating successive seismic waves with said seismic source at locations spaced at selected integral multiples of one-half the spacing between the centers of said detector groups;
initiating data acquisition with a first group of said detectors including the second one of said detector groups and each successive even numbered detector group along the length of said seismic spread being connected to the recording channels of said recorder;
switching said recording channels to a second group of said detectors including the first one of said detector groups and each successive odd numbered detector groups along the length of said seismic spread following the first seismic wave generation; and
continuing cyclic switching of said recording channels between said first and second groups of said alternate detector groups following each seismic wave generation.

10. A method of marine seismic exploration wherein a seismic spread having a plurality of seismic detector groups evenly spaced along the length thereof is towed through a body of water by a vessel, seismic data recording means being provided and including substantially one-half as many recording channels as compared with the number of said seismic detector groups, said method comprising:
initiating data acquisition with a group of alternating detectors, including one of said detector groups and each alternate detector group along at least a portion of the length of said seismic spread, being connected to the recording channels of said recorder;
towing said seismic spread through the body of water at an optimum constant speed for efficient data acquisition;
generating successive seismic waves at spaced intervals in said body of water at shotpoint locations spaced at integral multiples of one-half the spacing between said detector groups of seismic spread as said seismic spread is towed through said body of water;
switching said recording channels to alternate detector groups of said seismic spread in a direction opposed to the direction said seismic spread is being towed following each seismic wave generation; and
recording electrical impulses transmitted to said recording channels by selected detector groups that are electrically connected to said recording channels.

11. A method according to claim 10:
towing said seismic spread through said body of water at a constant speed.

12. A method according to claim 10, including:
generating said seismic waves at equally spaced intervals equaling one-half of the spacing of said detector groups of said seismic spread.

13. A method as recited in claim 10:
towing said seismic spread through said body of water and stopping said towing at each shotpoint location.

14. A method of seismic exploration wherein a seismic spread is utilized having detector groups evenly spaced therealong and seismic data recording means is provided having a lesser number of recording channels than the number of said detector groups, said method comprising:
initiating data acquisition with a first group of alternating detectors, including one of said detector groups and each alternate detector group along at least a portion of the length of said seismic spread, being connected to the recording channels of said recorder;
locating said seismic spread at successive shotpoint positions along a traverse;
generating seismic waves at each shotpoint position, said shotpoint positions being specifically located relative to said seismic spread;
cyclicly switching said recording channels in a repetitive sequence a number of detector intervals corresponding to the number of half detector intervals between each shotpoint location to establish electrical connection with appropriate selected ones of said detector groups; and recording electrical impulses generated by each of said selected detector groups responsive to seismic waves reflected from subsurface earth strata.

15. A method of seismic exploration as recited in claim 14 wherein:

said shotpoints are spaced along said traverse at a selected distance including one-half of the distance between the detector groups of said seismic spread and any integral multiple of said distance.

16. A method of seismic exploration wherein a seismic spread is utilized having detector groups evenly spaced therealong and seismic data recording means is provided having a lesser number of recording channels than the number of said detector groups, said method comprising:

locating said seismic spread at successive shotpoint positions along a traverse;

generating seismic waves at each shotpoint position, said shotpoint positions being specifically located relative to said seismic spread;

switching said recording channels between each shotpoint location to establish electrical connection with evenly spaced selected ones of said detector groups;

recording electrical impulses generated by said selected detector groups responsive to seismic waves reflected from subsurface earth strata;

said shotpoints are spaced along said traverse at a distance equal to one-half of the distance between the detector groups of said seismic spread; and said recording channels are connected with the even numbered ones of said detector groups at the beginning of said exploration and are switched alternatively between even and odd numbered detector groups between each shotpoint location.

17. A method of seismic exploration wherein a seismic spread is utilized having plurality of seismic detector groups evenly spaced along the seismic spread and seismic data recording means is provided having a lesser number of recording channels than the number of said detector groups, said method comprising:

initiating data acquisition with a first group of alternating detectors, including one of said detector groups and each alternate detector group along at least a portion of the length of said seismic spread, being electrically connected to the recording channels of said recorder;

locating said seismic spread at first positions along a traverse;

generating successive seismic waves at shotpoints specifically located with respect to said seismic detector groups;

recording electrical impulses generated by said first group of alternate detector groups responsive to seismic waves reflected from subsurface earth strata;

relocating said seismic detector groups at second positions along said traverse, said second positions being spaced at selected integral multiples of one-half detector interval from said first positions;

electrically disconnecting said first group of alternate seismic detector groups from said recording channels of said recording means;

connecting a second group of alternate seismic detector groups corresponding to the selected integral multiples to said recording channels of said recording means;

recording electrical impulses generated by reflected seismic waves generated at said shotpoints and received by said second group of alternate detector groups responsive to seismic waves reflected from subsurface earth strata; and continuing repetitively and in a predetermined sequence said relocation of said detector groups, generation of seismic waves and recording of electrical impulses from selected ones of said groups of said detector groups.

18. A method of seismic exploration wherein a seismic spread is provided having a plurality of seismic detector groups evenly spaced along the length thereof, seismic data recording means being provided and including a lesser number of recording channels as compared with the number of said seismic detector groups, said method comprising:

initiating data acquisition with a first group of alternating detectors, including one of said detector groups and each alternate detector group along at least a portion of the length of said seismic spread, being connected to the recording channels of said recorder;

generating successive seismic waves at shotpoints specifically located relative to said detector groups of said seismic spread and spaced along a traverse at a predetermined distance equal to one-half of the spacing of said detector groups or any integral multiple of said distance;

advancing the active location of said seismic spread a distance equal to the distance between said shotpoints between each seismic wave generation;

successively connecting selected groups of said alternating detectors to said recording channels of said recorder between each seismic wave generation; and recording electrical impulses transmitted by the selected groups of detectors responsive to seismic waves reflected from subsurface earth strata.

19. A method of multiple fold seismic exploration wherein the spacing of subsurface observation points is maintained at a predetermined desired interval of distance independent of the number of fold of subsurface observation points, in which a seismic spread is provided having a plurality of seismic detector groups with centers evenly spaced at distance x and the number of said detector groups is equal to the number of desired fold of subsurface observation points, a seismic recording means being provided using a lesser number n of recording channels than the number of seismic detector groups and wherein the ratio of the number of detector groups to the number of recording channels is an integer m greater than one, a cyclical switch being provided to select the sequence of detector groups to be connected to the recording channels said method comprising:

moving the seismic source and the seismic spread an incremental distance $x/2$ along the traverse;

connecting a selected sequence of said detector groups to said recording channels wherein the set of selectable sequences of detector groups is defined by:

$\{(w)th, (m+w)th, (2m+w)th, \text{---}, [(n-1)m+w]th\}$ wherein the members of each sequence refer to the position of the selected seismic detector groups relative to the total spread of detector groups which is considered consecutively ordered with the first seismic detector group identified as that one which leads the spread in the direction of the traverse and w is a cycle index equal to 1, 2, 3 - - - , (m);

advancing the cycle index w at each increment of $x/2$;

generating seismic waves as integral multiples of $x/2$ and recording the electrical impulses transmitted by the selected sequence of detector groups responsive to seismic waves returned from subsurface earth strata.

20. A method of seismic exploration utilizing in combination a seismic source, a seismic spread of equally spaced seismic dtector groups, seismic data recording means with a lesser number of recording channels than the number of seismic detector groups, and a switching unit which progressively connects the said recording channels to selected, regularly alternating sequences of said seismic detector groups thus dividing the seismic spread into a series of sub-groups each corresponding to one of said seismic data recording channels; said switching unit having a number of positions corresponding to the number of seismic detector groups in each sub-group and which successively connects each of the seismic data recording channels to corresponding ones of each associated sub-group of seismic detector groups in cyclic manner, said method comprising:

advancing the seismic source and the seismic spread along a traverse in a fixed horizontal relationship;

cyclically actuating said switching unit in synchronism with the movement of the seismic source and seismic spread along the traverse at intervals equal to integral multiples of one-half the spacing between the centers of adjacent seismic detector groups so that each seismic data recording channel is successively connected to corresponding ones of its associated sub-group of seismic detector groups in inverse succession with respect to the direction of movement along the traverse;

successively generating seismic waves with said seismic source at locations spaced at selected integral multiples of one-half the spacing between the centers of adjacent seismic detector groups;

recording the electrical impulses produced by the selected seismic detector groups in response to each seismic wave generation with the seismic data recording means;

cyclically repeating the switching, generation, and recording steps after all of the seismic detector groups of each sub-group have been successively connected to their associated seismic data recording channels in turn as the movement along the traverse is continued.

* * * * *

UNITED STATES PATENT OFFICE
CERTIFICATE OF CORRECTION

Patent No. 3,775,738              Dated Nov. 27, 1973

Inventor(s) Roy G. Quay, William Harry Mayne

It is certified that error appears in the above-identified patent and that said Letters Patent are hereby corrected as shown below:

Col. 3, line 31, "in" should read --is--.

Col. 8, line 17, "reflec-" should read --Reflec- --;
       line 65, the word "etectors" should be omitted.

Col. 9, line 15, "bdoy" should read --body--;
       line 18, "in taking" should read --is taking--.

Col. 10, line 6, "interger" should read --integer--.

Col. 12, line 13, between "a group" insert --first--.

Signed and sealed this 25th day of June 1974.

(SEAL)
Attest:

EDWARD M. FLETCHER, JR.          C. MARSHALL DANN
Attesting Officer                Commissioner of Patents